Dec. 28, 1954
N. I. KORMAN
2,698,377
RAILWAY SIGNALING SYSTEM FOR MEASURING
DISTANCE BETWEEN TRAINS
Filed Feb. 9, 1949
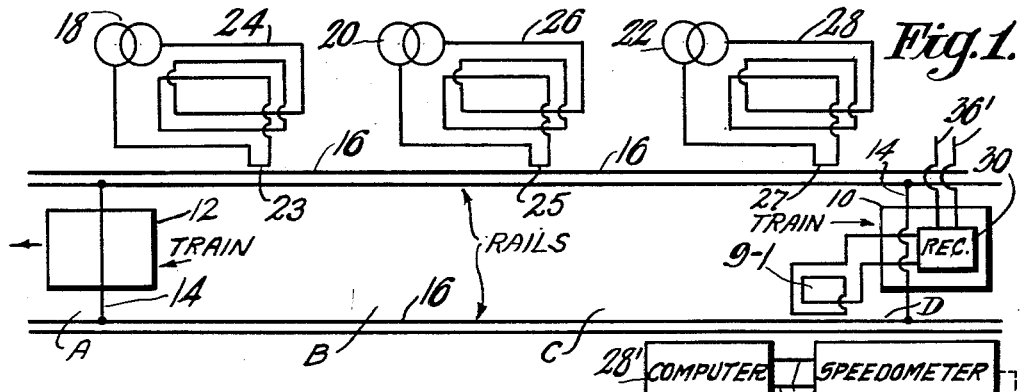
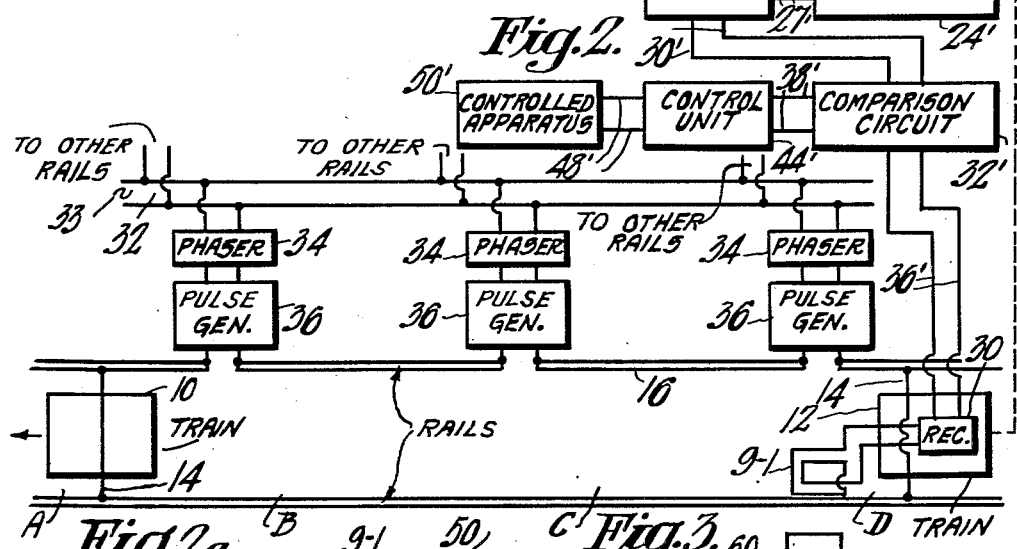
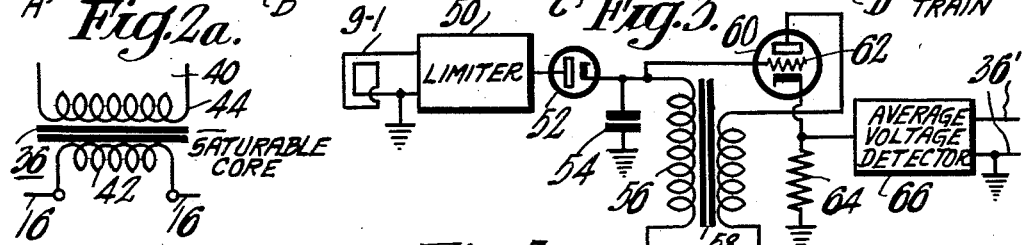
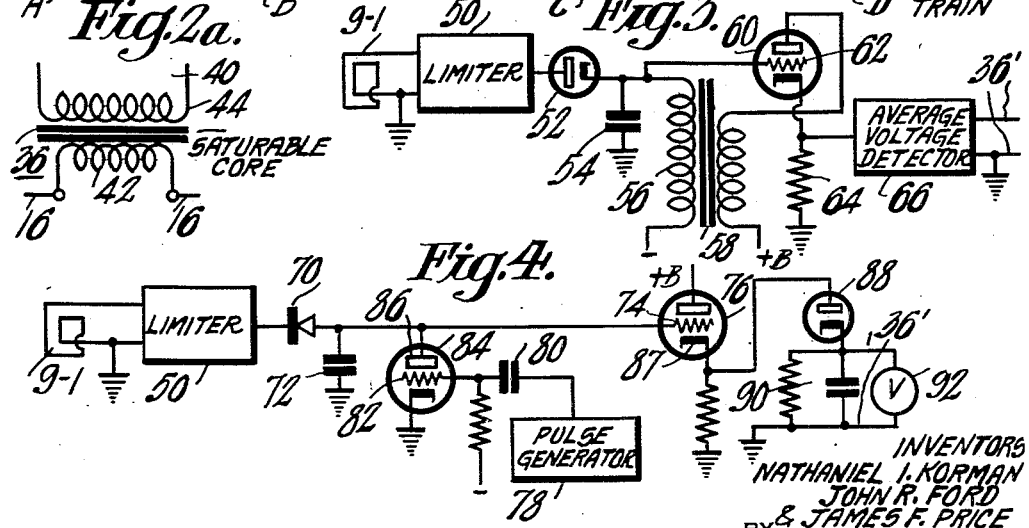
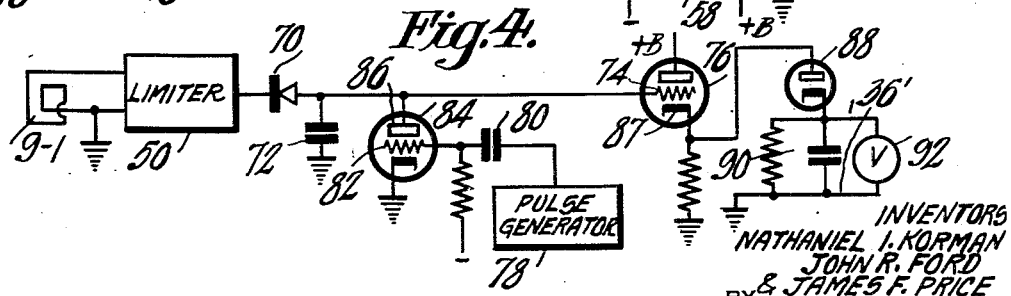
INVENTORS
NATHANIEL I. KORMAN
JOHN R. FORD
BY & JAMES F. PRICE
J. L. Whittaker
ATTORNEY United States Patent Office 2,698,377
Patented Dec. 28, 1954

2,698,377

RAILWAY SIGNALING SYSTEM FOR MEASURING DISTANCE BETWEEN TRAINS

Nathaniel I. Korman, Merchantville, and James F. Price, Erlton, N. J., and John R. Ford, Narberth, Pa., assignors to Radio Corporation of America, a corporation of Delaware Application February 9, 1949, Serial No. 75,342

1 Claim. (Cl. 246—30)

This invention is related to traffic control systems and is particularly applicable to railway traffic control systems. More broadly, the invention deals with measuring.

In the copending application entitled "Traffic Control" and filed by Nathaniel I. Korman et al., November 20, 1948, Serial No. 61,287, a novel traffic control system is described. In another application filed by Nathaniel I. Korman et al., January 4, 1949, Serial No. 69,222, entitled "Measuring," now abandoned, there is disclosed means for measuring the distance between one train and another in advance thereof. Certain of the distance measuring systems proposed for the purpose, use a change of signal characteristic at distance intervals along the right of way from one train to a following train whereby a measurement of the number of changes in signal characteristic give a measure of the distance between the following observing train and the train in advance. These systems have the disadvantage of introducing a loss in coupling the transmitter of the signals to the rails. This loss tends to accentuate the noise over the signal.

It is an object of the present invention to provide a traffic control system having a simple distance measuring means.

It is a further object of the invention to provide a distance measuring means and method for traffic control purposes having a high signal-to-noise ratio.

It is another object of the invention to provide a distance measuring means and method in a traffic control system characterized by simplicity, economy, and effectiveness.

A broader object of the invention is to provide novel means and methods for measuring the number of stations between two points.

These and other objects, advantages, and novel features of the invention will be more apparent, from the following description when taken in connection with the accompanying drawing in which:

Fig. 1 is a circuit diagram schematically illustrating the general principles of operation of the invention;

Fig. 2 is a circuit diagram schematically illustrating one embodiment of the invention in which pulse generators are supplied by power from an auxiliary transmission line.

Fig. 2a shows one form of pulse generator which may be used in the circuit of Fig. 2; and Figs. 3 and 4 are circuit diagrams schematically illustrating different receivers which may be used in the embodiment of Fig. 2.

In accordance with the invention the foregoing objects are achieved by feeding signals into a transmission path between two points, each signal having a different characteristic. A receiver responsive to the differences in characteristic thereby derives a measure of the number of stations between the two points. The invention is particularly applicable to railway signalling systems. When so applied, in accordance with a preferred form of the invention, an auxiliary transmission line is utilized carrying power of sinusoidal voltage, the pulses at each station being fashioned to occur at a different time from the pulses generated at the other stations. The pulse signals are connected serially between the tracks on block lengths, the paired tracks being connected together to form a common connection. The wheel and axle assemblies of one train and the wheel and axle assemblies of a train in the rear thereof complete the circuit so that the signal is transmitted from each station between the two trains around the completed loop circuit comprising rails and wheel and axle assemblies. Consequently, a receiver coupled to the completed circuit on the train in the rear and responsive to the frequency of occurrence of the pulses derives a response voltage which is dependent on the number of pulse generators in the loop circuit. Thus the invention may be considered as a method of deriving a measure of the distance between two points along a transmission path, the two points in this instance being the points of location of the two trains.

Referring now more particularly to Fig. 1 each train, of which trains 10 and 12 are indicated diagrammatically as rectangles, of a railway system may be traveling along the running rails 16. Signals may be generated by various generators of which generators 18, 20, and 22 are shown. The generators are coupled by coupling loops 24, 26, and 28 respectively at points 23, 25, and 27 along the rails which demarcate block lengths. Thus the rail system is divided into blocks of which those designated A, B, C and D are illustrated. The coupling loops 24, 26, 28 may be similar to the loop shown in Fig. 8 of the above-mentioned copending application Serial No. 69,222. In effect, therefore, the generators 18, 20 and 22 are serially coupled with the running rails of blocks A, B, C and D the rails of one side being connected together to form a return conductor. A signal is coupled from each generator which is different in some particular characteristic than the signal of each other generator, or at least different over a series of generators. It will be observed that no signal will be carried around the conductor system including the rails unless the rails 16 are connected together in some fashion. However, both trains 10 and 12 have a plurality of wheel and axle assemblies which short circuit one side of the rails to the other thereby completing the circuit. It will be obvious that the circuit could be completed by any suitable brush, either on the rails 16 or on conductors separate from the rails if these were used for the transmission path of the signals. In general, each train carries equipment similar to that being carried by train 10 comprising a coupling loop 9—1, again similar to the coupling illustrated in Fig. 8 of the above-mentioned copending application Serial No. 69,222 and a receiver 30. Coupling loop 9—1 is preferably carried in advance of train 10 and is the means for coupling the receiver 30 to the completed track circuit in which the signals initiated by the generators 18, 20, 22 are circulated. Any of various desired characteristics may be chosen as the one in which the signal generated by generators 18, 20 and 22 differ. For example, generator 18 may generate a signal of frequency $f-1$, generator 20 a signal of frequency $f-2$ and generator 22 a signal of frequency $f-3$ either of sinusoidal or other wave shape. The receiver 30 is responsive to the differences in this characteristic. Thus receiver 30 may be a frequency detector responsive to the various beat frequencies derived from the signals circulating the loop of track conductors completed by the axles of trains 10 and 12 and coupled thereto by coupling loop 9–1. The receiver may include a peak voltage detector to have an output proportional to the greatest voltage fed the peak detector which latter voltage is proportional to the greatest beat frequency detected. For example, generator 18 may have a frequency of 10,000 C. P. S., generator 20 of 10,200 C. P. S. and generator 22 of 10,400 C. P. S. Thus the receiver in the condition of tracks illustrated in Fig. 1 will detect a beat frequency of 400 C. P. S., among others, and on conductors 36′ will have an output responsive to the highest beat frequency detected. This receiver output may be utilized in a manner similar to that of receiver 30 in Fig. 2 of the said co-pending application Serial No. 69,222 or of the output of the radar (radio echo detection and ranging) system 12 of Fig. 1 of the copending application, Serial No. 61,287, as will be more fully explained hereinafter. It will be clear from what has been said that the receiver output is a measure of the number of stations on the transmission path which includes the tracks 16. Each loop of the transmission path comprising the tracks 16 and the axle and wheel assemblies of the trains. The loop completed by any two trains adjacent to each other is not coupled by a common wheel and axle assembly to a preceding or succeeding transmission path loop comprising other rails and wheel and axle assemblies, because the train always has more than one wheel and axle assembly. Therefore, the short-circuiting of one of the transmission path loops is not coupled by a conductor (which would be a single wheel and axle assembly) common to the adjacent transmission path loop. The signals are restricted to the signal path portion between trains. It is apparent that other characteristics, for example, such as phase, amplitude, etc. may be used with appropriate receivers.

Referring now more particularly to Fig. 2, there is illustrated in greater detail a system which has been more generally explained in connection with Fig. 1. The system of Fig. 2 comprises an auxiliary transmission line 32, a source 33 of sinusoidal voltage feeding line 32, a plurality of phasers 34 connected thereto at spaced points, and a series of pulse generators 36 connected to the phasers 34. The pulse generators are connected effectively serially with the tracks 16 of the running rails, either in the manner illustrated in Fig. 1, or by an actual series connection as shown schematically in Fig. 2. The wheel and axle assemblies of train 10 short-circuit the tracks 16 at a point in block A as indicated and wheel and axle assemblies of train 12 short-circuit tracks 16 at a point in block D. A coupling loop 9—1 couples the signal circulating in the completed track loop to a receiver 30 responsive to the difference in the time occurrence characteristic of the pulses provided by pulse generators 36 and supplies its response voltage to comparison circuit 32' via connection 36'. Auxiliary line 32 carries a sinusoidal signal having a frequency, for example, of 200 cycles per second. The phase shifters 34 may comprise a phase shifting network of lumped constant impedances, many of which are well known, suitable to the frequency of the sinusoidal signal on line 32 to give the desired phase shift. The pulse generators may consist very simply of a transformer arrangement as shown in Fig. 2a comprising a primary 40, a secondary 42, and a core 44 of the type which is almost immediately saturated by current therethrough. As will understood by those skilled in the art, the transformer of Fig. 2a having such a saturable core, in response to sinusoidal currents in primary 40 will induce in secondary 42 two pulses in each cycle of opposite polarity each time the current in primary 40 passes through the zero component thereof. The phasers 34 are each arranged or calculated to give a different phasing from the other phasers, or at least from a sufficient plurality of other phasers so that a series of them adjacent to each other will cover as large a track length as will ever comprise a loop circuit completed by the wheel and axle assemblies of the trains. The receiver 30 may be responsive to pulse frequencies, or, what is equivalent, it may count the number of pulses in a given interval of time. Because of phasers 34 it will be obvious that each pulse generator 36 within the completed loop circuit illustrated generates its pulses at times different and distinct from that of the other generators in the loop circuit. Thus the output of receiver 30 through connection 36' is responsive to the number of generators 36 between points of short-circuit of the wheel and axle assemblies 14, and this responsive voltage is supplied over connection 36' to a comparison circuit 32'. A speedometer 24' may be mechanically coupled to train 12 to produce a voltage which is connected through connection 27' to computer 28' which computes a voltage proportional to the assured clear distance in advance of the train and dependent upon the speed of the observing train 12, as more particularly described in the said copending application, Serial No. 61,287. The output from computer 28' is fed through connection 30' to the comparison circuit which compares it with the voltage from receiver 30 received on connection 36'. Results of the comparison are fed through connection 38' to a control unit 44' which may be similar to the control unit in the said copending application, Serial No. 61,287. Control unit 44' through suitable connection 48' may control any desired controlled apparatus 50'. It will therefore be apparent that the system of signal generators of the invention together with the receiver which constitutes a counter of the number of generators may be utilized as a distance computer from which may be derived a voltage which is a function of the distance of separation between train 12 and train 10 in advance thereof.

Although phasers could be placed along line 32, I prefer to place them as illustrated between the pulse generators 36 and line 32 because the generators can then be phased independently, and line 32 may feed pulse generators, also separately phased, on other rail systems adjacent the running rails 16. If the frequency of source 33 and phase velocity of line 32 are appropriately chosen, it would obviously be possible to omit the phasers entirely.

Referring now more particularly to Fig. 3 there is illustrated one simple type of receiver which may be utilized to count the frequency of occurrence of the pulses received from the pick-up loop 9—1. It will be obvious that any of several well known circuits may be used for this purpose. The one illustrated in Fig. 3 supplies the signals received by loop 9—1 to a limiter 50. It is obvious that signals of only one polarity need be considered. The limiter passes positive signals of limited amplitudes to a rectifier 52, which may be a diode. Limiter 50 tends to suppress the effects of noise in the system. The rectifier 52 in drawing current charges capacitor 54 through one of the coils 56 of the transformer 58 of a blocking oscillator arrangement 60. When the charge on capacitor 54 reaches a predetermined positive value blocking oscillator 60 will oscillate in well known manner and the grid current from grid 62 will discharge capacitor 54, whereupon succeeding pulses will recharge the capacitor. On each discharge, cathode resistor 64 of the blocking oscillator arrangement will draw a current. The average voltage across the cathode resistor 64 is proportional to the frequency of occurrence of oscillations. This voltage may be detected by an average voltage detector the response of which is substantially proportional thereto and the output of which is supplied over connection 36' to comparison circuit 32' as explained hereinbefore.

Referring now to Fig. 4 there is shown another arrangement alternative to that of Fig. 3 comprising coupling loop 9—1 and limiter 50. Positive limited pulses are passed by the limiter 50 to a rectifying element 70 the current through which delivers a measured charge to a capacitor 72. Each pulse will increase the charge on capacitor 72. The voltage on capacitor 72 is fed to the grid 74 of a cathode follower stage including a cathode follower tube 76. A pulse generator 78 feeds positive pulses at regularly recurring intervals through capacitor 80 to the grid 82 of tube 84. The anode 86 of tube 84 is connected to capacitor 72 and the recurring pulses discharge the capacitor. The cathode 87 of cathode follower 76 is connected to the anode 88 of a rectifier the cathode circuit of which comprises a resistor-capacitor combination 90.

In operation, the average voltage or peak on capacitor 72 is a function of the number of pulses passed by limiter 50 in the periods of time between the pulses generated by pulse generator 78. Use of the cathode follower stage 76 to feed the voltage on capacitor 72 to the rectifier 88 and resistor-capacitor combination 90 prevents loading of the circuit comprising the capacitor 72. The resistor-capacitor combination 90 averages the voltages fed through rectifier 88 from the cathode 87 of cathode follower stage 76 and preferably has a time constant to permit ready recovery within a time preferably not greater than the periods of oscillation of the voltage on line 32. The average voltage across resistor-capacitor combination 90 may be read directly on a meter 92 which may be calculated in terms of the number of generators 18, 20, 22 etc. coupled to the line between the two trains 10 and 12 or between train 10 and a short-circuit across tracks 16 in advance thereof. The connection 36' across which this average voltage appears may be applied to the comparison circuit 32' in an arrangement similar in other respects to the arrangement of Fig. 2 and comprising comparison circuit 32', control speedometer 24', computer 28', control unit 44' and control apparatus 50'.

It will be seen that the apparatus of the invention is superior in economy, providing phasing circuits and pulse generators which require no moving parts, inexpensive equipment, and low maintenance costs. Complicated interblock wiring is avoided. The arrangement of the invention affords superior results because a generator effectively in series with a transmission line provides a higher signal-to noise ratio than an arrangement in which similar generators are connected in parallel with the line. It will be understood that the advance stations at which the generators 18, 20, 22 etc. are coupled to the line may be spaced equally whereby a true distance measurement may be obtained, or that they may be spaced closer together in some places than in others for example, in a railway system, closer together on an upgrade than on a down grade, thus being spaced with a view to safety.

What we claim is:

A measuring system for measuring the number of stations between two points on the running rails of a railway system, comprising a plurality of pulse generators coupled effectively in series with said rails one at each station between said points, each pulse generator generating pulses of the same recurrence frequency but at times distinct from the times of occurrence of other pulses, means providing a short-circuit connecting the running rails at each of said two points whereby said running rails and said short circuit means comprise a transmission loop, and a receiver coupled to said loop and responsive to the frequency of occurrence of said pulses whereby the receiver response is a measure of the number of stations between the two points, said railway system including a train, said short circuit being a wheel and axle assembly of said train and, carried by said train, a speedometer computer arrangement having an output voltage which is a function of the speed of said train, a comparison circuit receiving and comparing the outputs of said speedometer computer arrangement and of said receiver, a control unit connected to said comparison circuit and responsive to said comparison, and apparatus controlled by said control unit.

References Cited in the file of this patent

UNITED STATES PATENTS

| Number | Name | Date |
|---|---|---|
| 1,690,459 | Sasnett | Nov. 6, 1928 |
| 1,690,505 | Sasnett | Nov. 6, 1928 |
| 1,710,499 | Lewis | Apr. 23, 1929 |
| 1,985,911 | Arkenburgh | Jan. 1, 1935 |
| 2,150,857 | Edwards | Mar. 14, 1939 |
| 2,214,924 | Griffiths et al. | Sept. 17, 1940 |
| 2,363,416 | Henroteon | Nov. 21, 1944 |
| 2,460,597 | Rodgers | Feb. 1, 1949 |
| 2,480,160 | Poylo | Aug. 30, 1949 |